United States Patent [19]

Pennington

[11] 4,240,855
[45] Dec. 23, 1980

[54] METHOD OF WELDING PLASTIC SHEETS EDGE-TO-EDGE

[76] Inventor: William Pennington, 317 S. West St., Anaheim, Calif. 92805

[21] Appl. No.: 66,843

[22] Filed: Aug. 15, 1979

Related U.S. Application Data

[60] Division of Ser. No. 900,529, Apr. 27, 1978, Pat. No. 4,177,100, which is a continuation of Ser. No. 749,828, Dec. 13, 1976, abandoned.

[51] Int. Cl.³ .................... B29C 27/04; B65H 69/08
[52] U.S. Cl. ............................. 156/159; 156/258; 156/267; 156/273; 156/304.6; 156/502
[58] Field of Search ............... 156/73.4, 157, 159, 156/251, 258, 267, 272, 273, 304, 502, 515, 583.1

[56] References Cited

U.S. PATENT DOCUMENTS

| 3,419,447 | 12/1968 | Hewitt | 156/73.3 |
|---|---|---|---|
| 3,508,989 | 4/1970 | Lawrence et al. | 156/258 |
| 3,589,959 | 6/1971 | Sander et al. | 156/159 |
| 3,933,565 | 1/1976 | Printz et al. | 156/304 |
| 4,135,957 | 1/1979 | Voller | 156/157 |

Primary Examiner—Michael G. Wityshyn
Attorney, Agent, or Firm—William W. Haefliger

[57] ABSTRACT

An improved weld is formed between plastic sheets, by performing the steps that include:
(a) deforming two joint defining work sheets into a volumetric position substantially defined by two un-deformed sample sheets positioned in edge-to-edge position, the work sheets and sample sheets having the same thickness, and
(b) heating the deformed work sheets under pressurization at said joint to soften them to form an improved weld therebetween characterized in that the sheet thickness remains the same at and proximate the weld.

7 Claims, 12 Drawing Figures

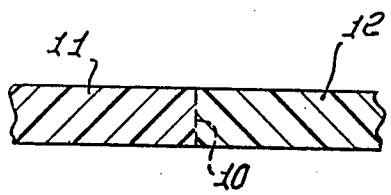
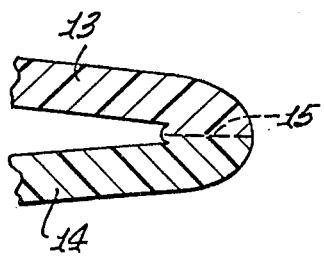
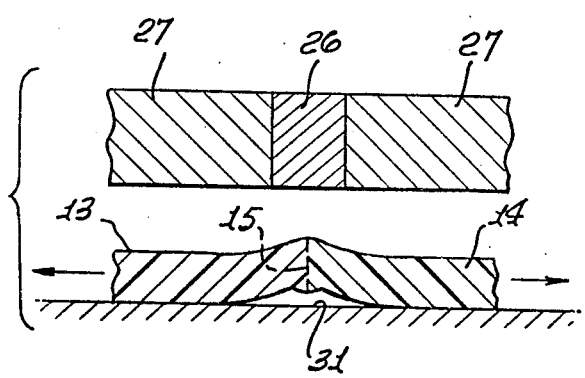
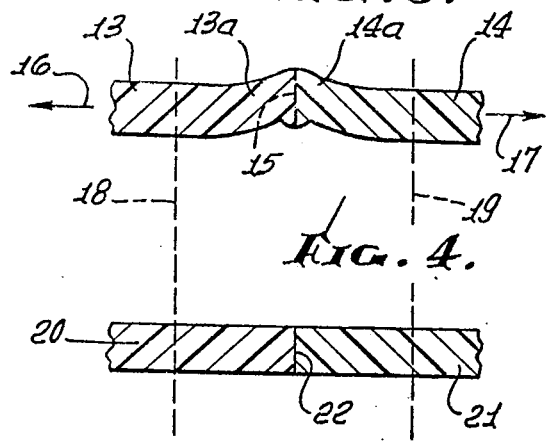
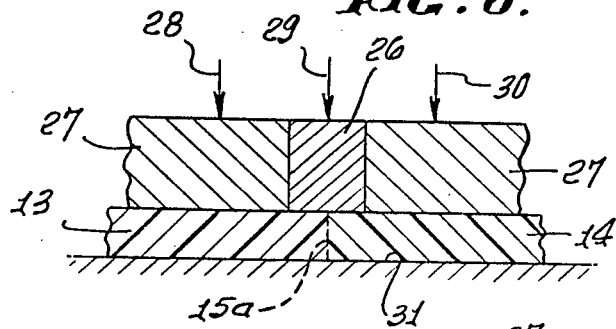
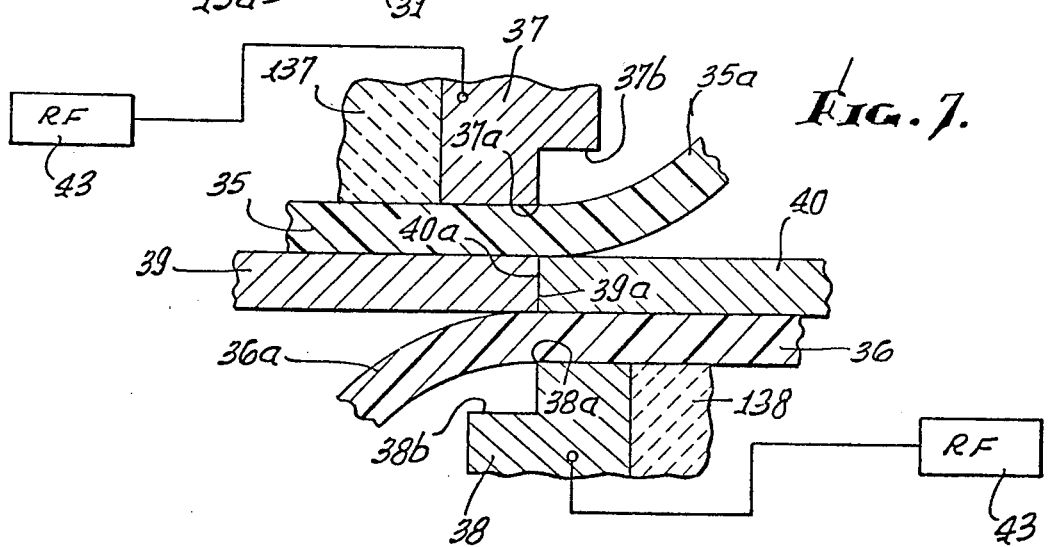

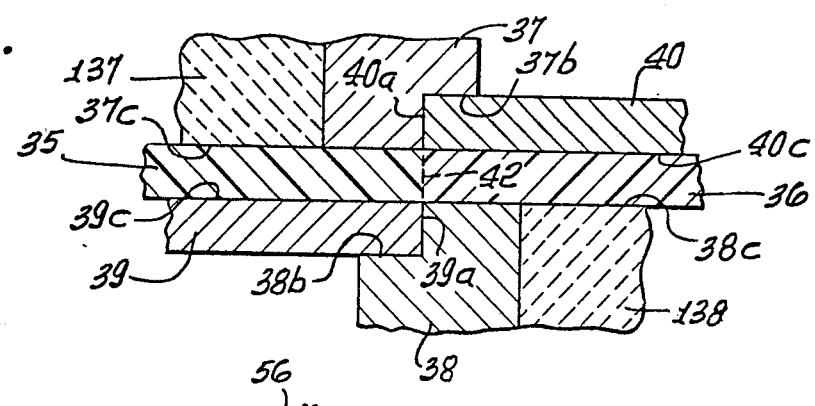
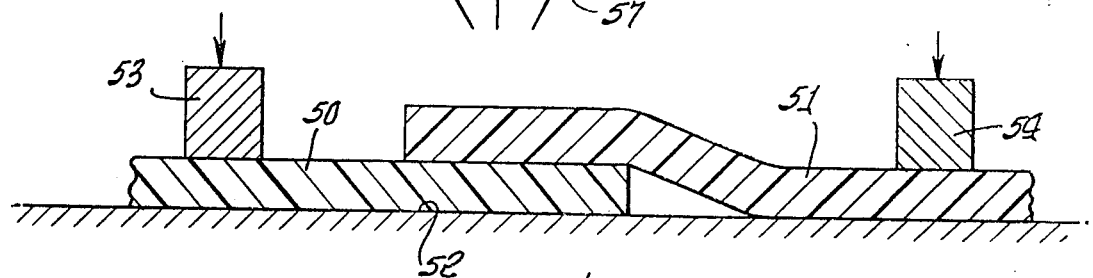
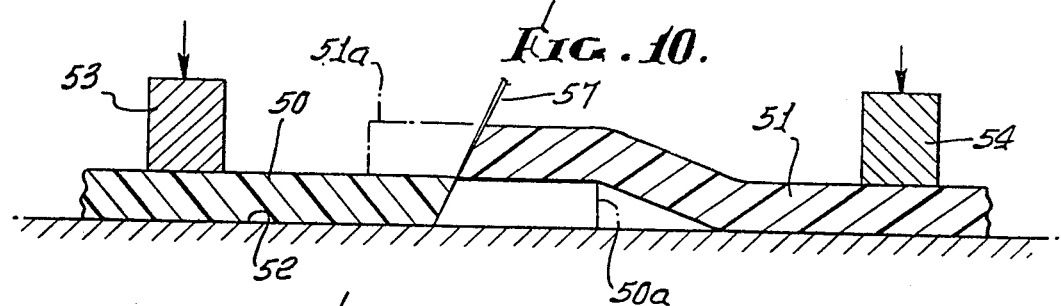
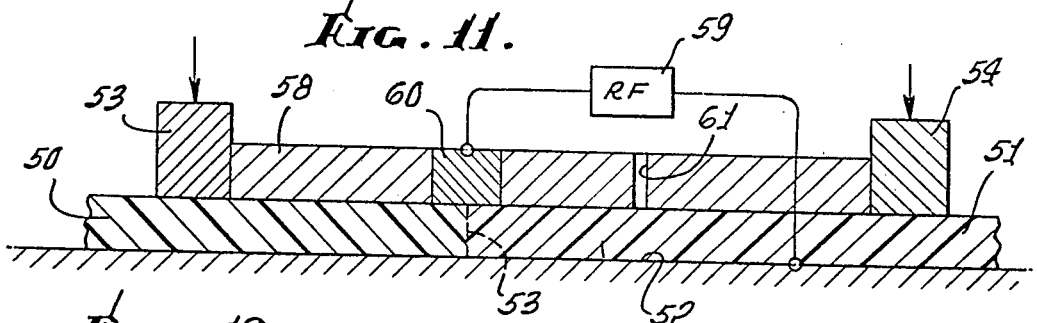
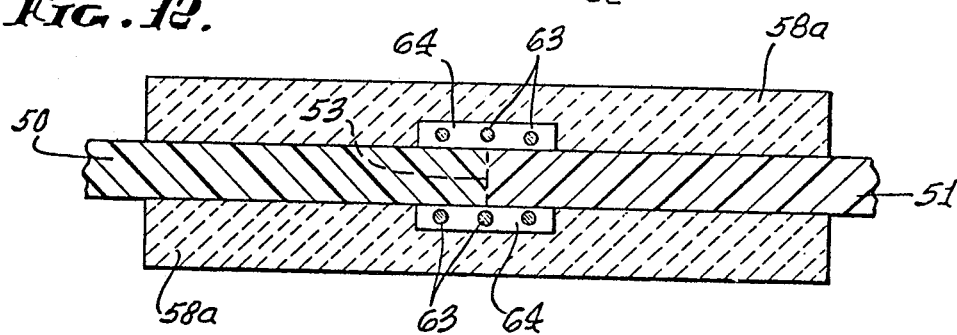

METHOD OF WELDING PLASTIC SHEETS EDGE-TO-EDGE

This is a division of application Ser. No. 900,529, filed Apr. 27, 1978, now U.S. Pat. No. 4,177,100, which is a continuation of application Ser. No. 749,828, filed Dec. 13, 1976, now abandoned.

BACKGROUND OF THE INVENTION

This invention relates generally to processes that produce seals or welds between plastic sheets, as for example polyvinyl chloride plastic sheets, important to the art of plastic goods manufacture. More particularly, it concerns the attainment of more perfect (i.e. high strength) welds between such sheets.

A number of these prior processes employ heat to soften, semi-liquefy, or liquefy regions of sheet which are held together, under pressure, until cool to produce welds. The heat employed may be conducted into sheet regions from heated solid dies, convected and conducted into sheet regions from hot air or gas, produced within sheet regions by molecular vibrations induced by rapidly varying electric fields (radio frequency heat sealing) or rapidly varying elastic compressions (ultrasonic heat sealing), or some combination of these.

The methods presently employed in welding together plastic sheets (with the exception of methods using filler rods analogous to welding rod used with metals) produce two types of welds.

The "Butt Weld" between plastic sheets (a misnomer relative to metal welding parlance) is produced by sealing two layers of plastic sheets together at overlaying edges. In use, the two sheets are ordinarily unfolded so that the "Butt Weld" forms a more or less distorted and puckered seal between two sheet edges. When stressed, the "Butt Weld" usually causes the virgin sheet to break immediately adjacent to the "Butt Weld" at a stress of 60 to 65% of its breaking strength at a distance from the "Butt Weld".

The "Lap Weld" is produced by sealing two plastic sheets together at overlapping edges.

When stressed the "Lap Weld" usually causes the virgin sheet to break immediately adjacent to the "Lap Weld" at a stress of 80 to 85% of its breaking strength at a distance from the "Lap Weld".

The lower plastic sheet breaking strengths adjacent to "Butt Welds" and "Lap Welds" are well explained by the theory of elasticity which is confirmed by experimental methods. In both cases the redistribution of stresses adjacent to and across results in stress concentrations adjacent to the welds in excess of the essentially uniform stresses across sheets at substantial distances from welds (St. Venant's Principle).

SUMMARY OF THE INVENTION

It is a major object of the invention to provide an improved method or methods for providing welds between plastic sheets, such methods overcoming the above described problems and difficulties. Basically, the improved method includes the following steps:
(a) deforming two joint defining work sheets into a volumetric position substantially defined by two undeformed sample sheets positioned in edge-to-edge position, the work sheets and sample sheets having the same thickness, and
(b) heating the deformed work sheets under pressurization at said joint to soften them to form an improved weld therebetween characterized in that the sheet thickness remains the same at and proximate the weld.

As will appear, and in the case of prior butt welding, the deformation step includes stretching of the sheets to tension the butt weld so that the volumetric relationship described above may be achieved; thereafter, a heat transfer body may be placed in contact with the tensioned butt weld, and heat transferred into the weld while pressure is also applied.

In another example, the work sheets are initially placed in overlapping relation, and the deformation step is effected by shearing the sheets and displacing them into near edge-to-edge relation, followed by compressing and heating them to produce the improved weld, as will be seen.

These and other objects and advantages of the invention, as well as the details of illustrative embodiments, will be more fully understood from the following description and drawings, in which:

DRAWING DESCRIPTION

FIG. 1 is a section through an edge-to-edge perfect weld between two plastic sheets;

FIG. 2 is a section through a butt weld joint;

FIG. 3 is a section through the FIG. 2 after it is stretched;

FIG. 4 is a section through a theoretically perfectly weld joint between sheets having equal volumes relative to the FIG. 3 sheets;

FIG. 5 shows application of heated die to the FIG. 3 sheets;

FIG. 6 shows the die and sheets of FIG. 5, after welding is completed;

FIGS. 7 and 8 show the application of cutting and heat sealing dies to two sheets, respectively before and after cutting and sealing;

FIG. 9 is a section showing overlapped and clamped sheets to be subjected to cutting;

FIG. 10 is a section showing cutting of the FIG. 9 sheets;

FIG. 11 shows auxiliary clamping of the FIG. 9 sheets and welding of the clamped sheets, using radio frequency energy; and FIG. 12 shows another method of heat transfer to the clamped sheets.

DETAILED DESCRIPTION

FIG. 1 shows a "perfect weld" at the broken line location 10 between two thermo-plastic sheets 11 and 12 of equal thickness. The sheets may for example consist of polyvinyl chloride (PVC). Both the cross section and material elastic properties are uniform across the weld. In this regard, any change of section, whether increase or decrease, across the weld will result in stress concentrations when the joint is stretched; and any variations in elastic properties as between the sheets will result in stress concentrations with flexure of the sheets, or combined stretch and flexure. Conditions for providing the "perfect weld" of thermo-plastic sheets are listed as follows:

(1) Clean surfaces (i.e. surfaces free of gas or film material, and chemically unaltered) must be brought together;

(2) The surfaces must be heated to a soft, semi-liquid, or liquid state;

(3) The heated surfaces must be forced together under sufficient pressure (characteristic of the particular plastic and the softening produced) to provide ultimate molecular contact, and disappearance of the contacting surfaces as boundaries of property discontinuities; and (4) The sheet regions across and adjacent to the surfaces being welded together must be held under applied pressure, as in a mold or die, to enforce continuity of sheet thickness across the joint region until the formed sheets are cooled, in order to resume their normal ambient temperature solid properties.

In terms of method and sequence, the above conditions may be employed to form an improved weld between plastic sheets by means of the following steps:

(a) deforming two joint defining work sheets into a volumetric position substantially defined by two undeformed sample sheets positioned in edge-to-edge position, the work sheets and sample sheets having the same thickness, and (b) heating the deformed work sheets under pressurization at said joint to soften them to form an improved weld therebetween characterized in that the sheet thickness remains the same at and proximate the weld.

While the "perfect weld" is in practice unattainable, it may be closely approximated (as for example by attainment of 95% or better of virgin sheet strength in the weld region, as contrasted with 60—85% by previously known methods), in accordance with the present invention. Several techniques, employing the basic method, are depicted as follows:

THE RESHAPED BUTT-SEAL TECHNIQUE

Referring to FIG. 2, two thermo-plastic work sheets 13 and 14 are initially subjected to butt welding, as by heating, at the location 15, thereby to form a joint. The sheets are then reformed, for example as by stretching in opposite directions (indicated by arrows 16 and 17), so as to stretch the weld 15, thinning the sheet thicknesses in the cusp shaped regions 13a and 14a proximate the weld. Such stretching of the sheets deforms them into a volumetric position (indicated between broken lines 18 and 19) substantially equal to that defined by the two undeformed sample sheets 20 and 21 positioned in edge-to-edge contact at locus 22. Alternatively, the butt can be configured so that the volumetric result can be achieved without lateral stress (tension of compression) across the sheet boundary. Sheets 13, 14, 20 and 21 have the same thickness.

Heating of the thus-formed sheets 13 and 14 may for example be carried out as in FIGS. 5 and 6, wherein a heat transferring body is placed in contact with the stretched butt-weld so that heat flows by conduction into that weld to soften the material. Pressure is applied at the same time via the body. As illustrated, a heated or hot body part 26 is lowered into contact with the weld material so that pressure is applied and heat flows into the material at and adjacent the joint; however, tension is not applied to the heat liquified zone of the thermo-plastic sheets, during sealing. Body parts 27 are maintained in sufficiently cool state so as not to soften the material thereunder. Pressure is applied as indicated by arrows 28–30, and a flat support appears at 31. The finished joint at 15a has the appearance of joint 10 in FIG. 1.

The key to the FIG. 2 process lies in deforming the heat seal in accordance with the above description of FIGS. 3 and 4.

CUTTING AND SEALING METHOD

In the form of the invention shown in FIGS. 7 and 8, the work sheets 35 and 36 are initially placed in overlapping relation, and the deformation is effected by shearing the overlapping sheets and relatively displacing them (in directions parallel to their thickness dimensions) into edge-to-edge relation. As shown, shear dies 37 and 38 with cutting edges 37a and 38a are initially provided at opposite sides of the sheets 35 and 36, and displacement of the sheets is effected by displacing the shear dies relatively toward one another, as from FIG. 7 position to FIG. 8 position. Two intermediate plates 39 and 40 are typically initially located between the sheets 35 and 36, so that the plates form an edge-to-edge joint at 39a and 40a in alignment with the shear edges 37a and 38a. When the dies are moved relatively toward one another, the surplus strips 35a and 36a are sheared off; and the plates 39 and 40 are displaced away from one another, i.e. to positions as seen in FIG. 8. Die shoulders 37b and 38b act as stops limiting plate displacement so that the plate and die surfaces 37c and 40c become co-planar, and the plate and die surfaces 39c and 38c become co-planer, to pressurize the work sheet extents 35 and 36 brought into edge-to-edge alignment and contact at 42. Heat may initially be transferred to the sheets from the dies in FIG. 7 to soften them prior to shearing; and heating may be interrupted during shearing, and resumed in FIG. 8 after shearing, to soften the joint 42 and enable formation of an uninterrupted joint. Radio frequency energy may be employed, as indicated at 43.

The dies may include dielectric elements 137 and 138 located as shown to define adjacent non-melting regions of the sheets. Such solid regions of the sheets act as stops, to prevent the dies from closing too far, with consequent extruding of the melted portion of the sheets, sidewise. This obviates need for a complex press adjustment to stop the dies at the sheet thicknesses—particularly along a long die.

CLAMP, CUT, STRIP AND SEAL METHOD

In the form of the invention seen in FIGS. 9–11, the work sheets 50 and 51 are initially placed in overlapping relation (as in FIG. 9, on a support 52); they are clamped, as at 53 and 54; deformation is effected by shearing the overlapping sheets, as for example is indicated in FIG. 9; the excess sheet material 50a and 51a is stripped away and the sheets are relatively displaced (in directions parallel to their thickness dimensions) into edge-to-edge relation; and the sheets are then pressurized and heated to form the "more-perfect" joint at 53 depicted in FIG. 11. Various shear angles are represented by the blades 55–57 in FIG. 9, blade 57 being employed in FIG. 10 to effect the cut. Note the acute angularity of the blades 55 and 57. Pressurization of the cut sheets as by clamp 58 in FIG. 11, is such that the sheets are brough into edge-to-edge contact no matter whether or not a gap exists between the sheet cut edges when the latter are displaced into the same plane. During such pressurization, heat is transferred into the sheet material adjacent such edges, as by radio-frequency dielectric heating via generator 59 and element 60 applied to the joint. Clamp 58, in contact with the RF die, is of non-conductive material. Air trapped between the sheets and the bed or support 52 may be released, as via a port 61 in auxiliary clamp 58. Controlled (or control of the) cutting angle of the blade or blades 55–57 establishes control of the compression or gap between the cut sheets, i.e. a critical cutting angle will be characterized by minimum (or zero) need for die force to close the gap between the sheets edges at the time of sealing.

FIG. 12 shows an alternate conductive heating method, with heating elements (such as Cal rods 63) embedded in heat conductive metal elements 64 carried by the auxiliary clamp 58*a* at opposite sides of the two sheets 50 and 51. Rods 63 are electrically resistively heated, and elements 64 are directly applied to the sheet material adjacent the joint 53. Ultrasonic heating could also be employed.

If the thickness dimension between the clamp and support 52 in FIG. 11 (or between clamp 58*a* in FIG. 12) is held constant during heating, the thermal expansion of the plastic material (some 20 times greater than the metal) will increase the pressure in the heated region.

I claim:

1. In the method of forming an improved weld between plastic sheets, the steps that involve:
    (a) deforming two joint defining work sheets into a volumetric position substantially defined by two undeformed sample sheets positioned in edge-to-edge position, the work sheets and sample sheets having the same thickness, and
    (b) heating the deformed work sheets under pressurization at said joint to soften them to form an improved weld therebetween characterized in that the sheet thickness remains the same at and proximate the weld,
    (c) the work sheets being initially placed in overlapping relation, with shear dies initially provided at opposite sides of said overlapping work sheets, and with two intermediate plates initially located between the overlapping work sheets so that the plates form a joint in alignment with shear edges formed by the dies, and said deformation being effected by shearing the overlapping work sheets and relatively displacing the sheared work sheets in the directions of their thicknesses into edge-to-edge relation, said shearing and displacement of the sheets being effected by displacing the shear dies relatively toward one another.

2. The method of claim 1 including relatively displacing the two plates away from one another during shearing of the work sheets, and said heating is effected by transferring heat into the plates and from the displaced plates into the work sheets.

3. The method of claim 1 including employing dielectric members to move with the shear dies to engage and stop against non-melting portions of the sheets.

4. The method of claim 1 wherein said shearing of the sheets forms sheet edge portions which are acutely angled relative to the sheet surfaces.

5. The method of claim 1 including the step of exerting clamping pressure on the sheets after they are displaced into edge-to-edge relation, and at the joint formed between said edges, and while said heating step is carried out.

6. The method of claim 5 wherein said heating is effected by transmission of radio frequency energy into the sheets.

7. The method of claim 5 wherein said heating is effected by electrical generation of heat proximate the joint, and transmission of said generated heat into the sheet.

* * * * *